United States Patent Office.

WILLIAM HEWITT, OF PIMLICO, ENGLAND.

Letters Patent No. 80,544, dated August 4, 1868.

---

IMPROVED COMPOSITION FOR PREVENTING INCRUSTATION IN STEAM-BOILERS.

---

The Schedule referred to in these Letters Patent and making part of the same.

---

TO ALL WHOM IT MAY CONCERN:

Be it known that I, WILLIAM HEWITT, of Pimlico, in the county of Middlesex, England, have invented a new and useful Improved Composition for Preventing Incrustation in Steam-Boilers; and I hereby declare that the following is a full and exact description thereof.

The nature of my invention consists in combining tannic acid with unctuous animal matters, such as leather, in the manufacture of an improved composition suitable for preventing incrustation in steam-boilers.

To enable others skilled in the art to make and use my invention, I will proceed to describe the mode of manufacturing the aforesaid composition, and the operation thereof, as follows:

I take leather, in any shape or form, or other materials prepared, dressed, or impregnated with bark or tan, such as is used by tanners in tanning leather, and boil the same to a pasty consistence, adding, if necessary, tannic or gallic acid, or both, in the proportion of about one-quarter of an ounce of acid to forty pounds' weight of the material. I then take this pasty mass, and run it into moulds of various shapes, until it becomes solidified. The composition is then fit for use, and can be introduced into the boiler, either through the man-hole or other suitable aperture, at the rate of about one pound of the composition to every nominal horse-power of the boiler. In practice, I have found this quantity last about six weeks. The composition becoming heated, its active properties and virtues, hereafter set forth, will be developed.

Among the novel features (or novelties) of this invention, the inventor dwells upon the combination of tannic or gallic acid, or both, with unctuous animal matter, in a solid mass, for speedily removing incrustation from steam-boilers when it has formed, and for completely preventing the formation of incrustation when it has not previously existed, and to retaining this or these valuable properties, practically accompanied by the frequent and necessary blowing-off the boilers when the salt water has become too concentrated.

In the first case, the active agents, i. e., the tannic and gallic acid, and unctuous matter, given off slowly by the mass under the action of heat, by dissolving the portion of incrustation in immediate connection with the metal of the boiler, set free the general mass, which can be removed from the boiler at the earliest convenient opportunity. This action is found to be especially efficacious in the removal of incrustation from those portions of the boiler, such as the tubes and other parts, which are inaccessible to scrapers and other instruments. These agents, having removed incrustation, are diffused over the inner face of the boiler, and forming a thin, liquid coating over it, prevent the adhesion of any sediment or other deposit thereto, by preventing oxidation, and holding in solution the salts adjacent.

In the second, and, perhaps, more important case, fresh portions of the aforesaid active agents of the composition are given off from time to time, or continuously, and being diffused over the inner surface of the boiler by the continual action of the ascending and rotating particles of water induced by the heat, form a thin film of an unctuous liquid over the inner face of the boiler, tubes, and other parts interposed between it or them and the water, thereby preventing any deposition or deposit of sediment or of salt on the metal. By using the composition in a solid block, the boiler may be blown off without fear of impairing the active properties of the composition which remains, and which, so long as any portion of the block shall remain, continues to disseminate efficaciously its active properties.

For the sake of convenience, I can, by the undermentioned process, render the solidified composition above set forth of a semi-liquid or jelly-form, by first reducing it to small particles by any convenient means, and then adding thereto about one part of the common soda of commerce to about two parts of the first above-named composition, adding, if necessary, a small quantity of tallow, grease, or other fatty matter, which I again boil until it assumes the semi-fluid or jelly-form I require, which, when cool, can be introduced into boilers which do not present facilities for introducing thereinto the composition in block-form, or in a solid mass. In practice, I have found this semi-fluid composition answer well in boilers when used in the proportion of about one pint per month of the composition to every nominal horse-power of the boiler.

The above is a convenient form of composition, but I prefer the solid-block form, as being more satisfactory in its action.

Having now fully described my invention, and the manner of operation, I hereby declare that what I claim as my invention, and desire to secure by Letters Patent, is as follows:

I claim the use of tannic acid, in combination with unctuous animal matter, in a solid form, for the purpose of preventing incrustation in steam-boilers.

WM. HEWITT.

Witnesses:
G. F. WARREN,
THOMAS LAKE,
} Both of No. 17 Gracechurch Street, London, E. C.